July 3, 1923.

R. F. HALL

CAM

Filed Nov. 5, 1920

Inventor:
Robert Frederick Hall
By his Attorneys
Baldwin & Wight

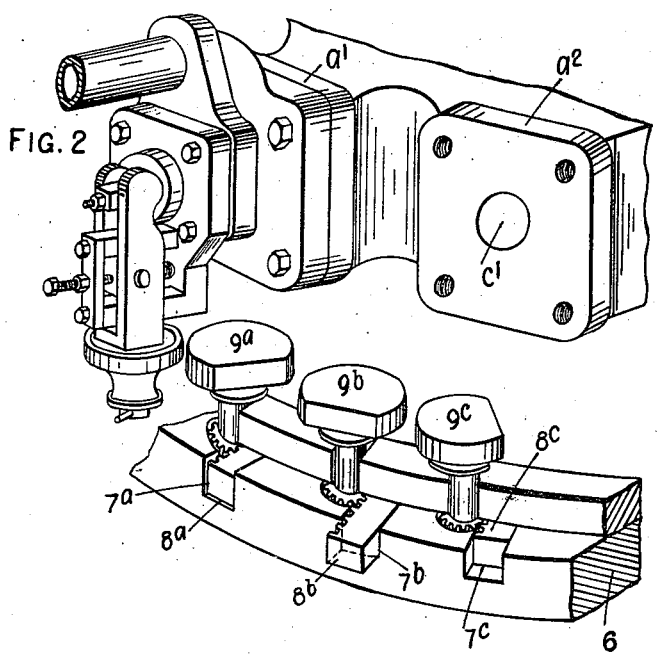

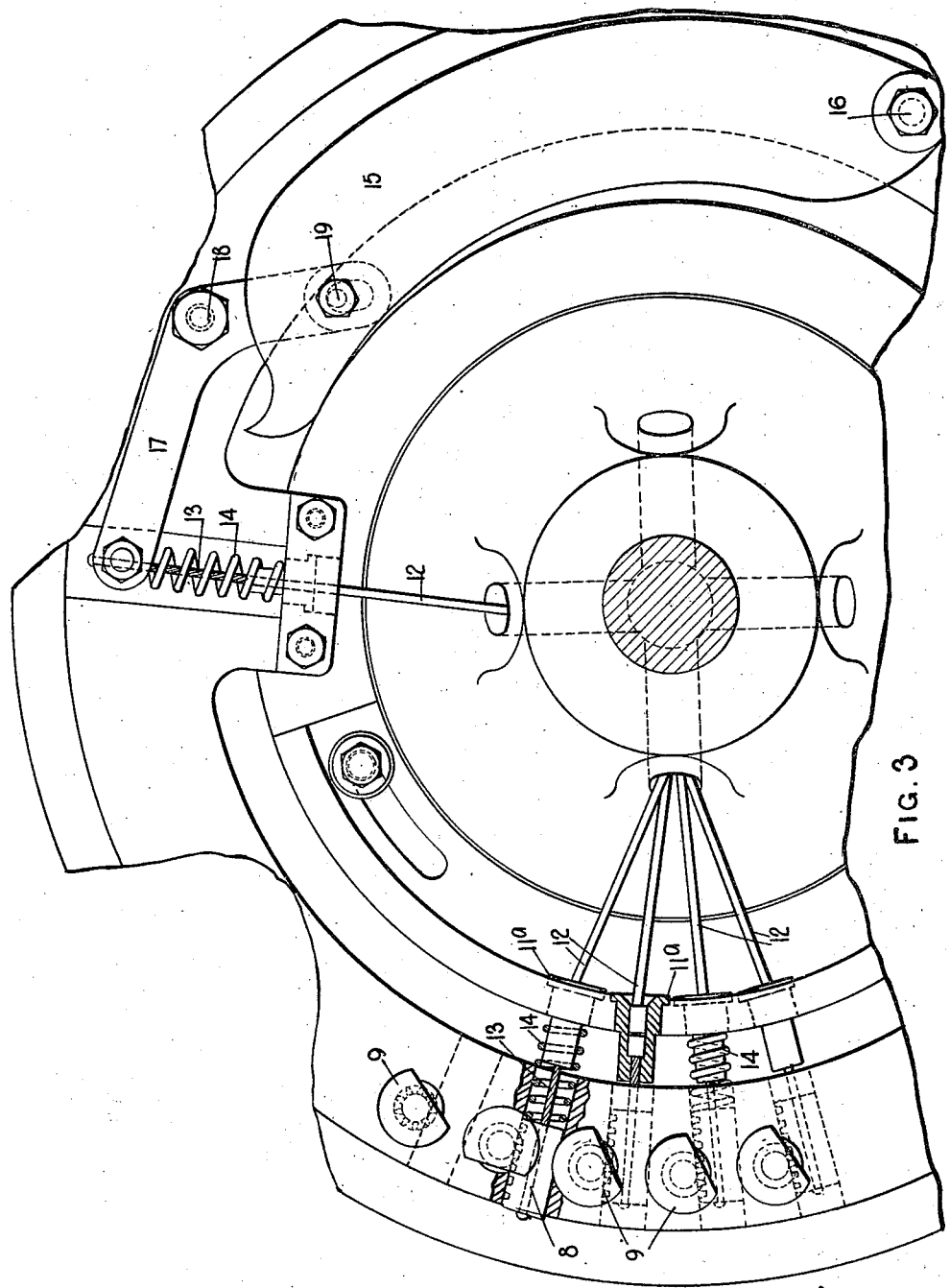

Patented July 3, 1923.

1,460,651

UNITED STATES PATENT OFFICE.

ROBERT FREDERICK HALL, OF MOSELEY, NEAR BIRMINGHAM, ENGLAND.

CAM.

Application filed November 5, 1920. Serial No. 422,048.

*To all whom it may concern:*

Be it known that I, ROBERT FREDERICK HALL, a subject of the King of Great Britain and Ireland, and resident of "Ferndale," 45 Church Road, Moseley, near Birmingham, have invented certain new and useful Improvements in and Relating to Cams, of which the following is a specification.

In many classes of machines, cams or camways are provided for operating parts periodically, and/or for various and varying intervals of time, and it is often necessary or desirable to provide means whereby the period of time after which, or the length of time during which a device is operated can be varied or to vary the amplitude of the stroke communicated to an operated part by a cam or camway.

With these ends in view, it has been customary, with many machines, to furnish removable cams or cam surfaces and to provide a number of sets of cams or surfaces of different shapes, so that when the operation of the machine has to be varied, one of the cams or the parts constituting the cam surface can be removed and replaced by a part or parts of different shape.

This method of procedure is open to objection, in that it generally necessitates the stopping of the machine, which is often a very serious drawback. Moreover, a fresh cam or cam surface may not be available for effecting the exact adjustment desired by the operator.

The object of my present invention is to provide means whereby the contour or the surface of the cam or cam way may be varied within wide limits to suit the requirements of the particular cases, at the will of the operator, and that without the necessity of stopping or in any way interfering with the working of the machine.

According to the general principle of my invention in place of providing a cam or cam way of the ordinary construction for operating the parts, I form the operating surface of the cam or cam way from a plurality of units or parts placed in such juxtaposition to one another that their combined surfaces constitute the operating part of the cam or cam way and these units are so mounted and arranged that the operating part of each may be protruded to a greater or less degree with regard to the neighbouring unit, thus enabling the shape of the operating surface of the cam or camway to be varied. Each of the units has associated therewith controlling means whereby it can be protruded, retracted or brought into any required position, and this controlling means is so arranged that it can be manipulated by the operator without stopping the machine.

In this way the durations of and the intervals between the operation, or the stroke or amplitude of the operation may be adjusted with great accuracy to suit the requirements of particular cases.

To further explain the nature and scope of my invention I will now proceed to describe its application to machines for the manufacture of glass articles, wherein air is used for the production or shaping of the article, my present invention being particularly suitable for controlling the operating parts of such machines.

In the machines of the type under consideration for making glass articles, the air is controlled by means of valves and these valves are usually operated by a cam like fixture attached to the machine and having various profiles, projections or contours. In some cases the valve mechanism rotates around the cam, whilst in other cases the cam may be rotated with respect to the valve mechanism.

So far as the use of air in machines of the type under consideration for the purposes of blowing articles to form is concerned, experience shows that the quantity of air used during the time or times of and the intervals between the blowing operations vary according to the size and shape of the article, the viscosity of the glass and the working conditions. It follows, therefore, that it is necessary in all machines for blowing glass articles that cam mechanism should be used which is capable of producing these variations.

As previously stated the present practice is to supply sets of interchangeable cams or camway fixtures having different contours or projections, each set being designed to give the most suitable results for a particular article or range of articles. Consequently when the machine is required to produce a different article, or range of articles, it is necessary to stop it, to remove the set already in place, and to fix a different set in position: and this change involves the loss of time and labor.

The accompanying drawing shows by way of example one method of applying my invention to overcome these drawbacks, and illustrates the application of said invention to the blowing control of a rotary machine for the manufacture of glass articles.

Fig. 2 is a fragmentary perspective view illustrating substantially the same portion of the machine.

Fig. 3 is a top plan of the cam plate and associated parts.

The same symbols of reference are employed to denote similar parts in all the views.

Figure 1:
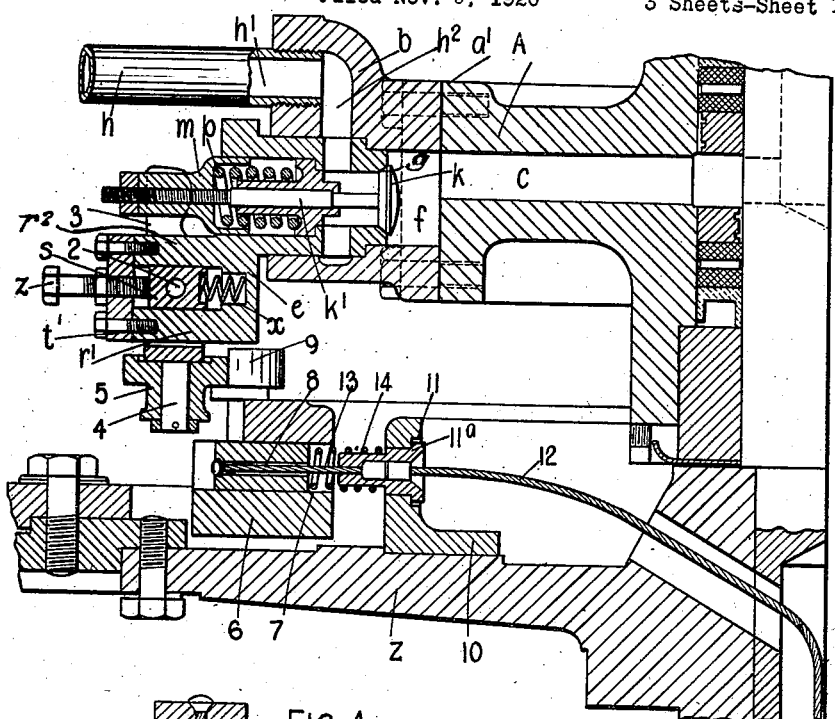
Fig. 1 is a vertical section showing a portion of the rotatable crown of the machine and the adjacent relatively fixed cam plate fitted with adjustable cam members constituting the principal feature of my invention.

A is a portion of the rotatable crown provided with projecting surfaces $a^1$, $a^2$ to which are fitted the valve chambers or casings $b$. $c$ is a channel in connection with the supply of blowing air terminating in an aperture $c^1$ in the face of the projection $a^1$, $a^2$.

Each of the valve casings is provided with a body portion $b$ adapted to be bolted to the face of the projection $a'$ into which fits a socket portion $e$ carrying the valve operating mechanism hereinafter described.

The body portion $b$ is provided with an opening $f$ constituting the valve chamber and coming opposite the aperture $c^1$, when the body $b$ is bolted in position.

The socket portion $e$ is furnished with a valve seating $g$.

$h$ is the pipe leading to the blowing head of the machine and connected at $h^1$ to the valve casing, the said pipe communicating by means of a conduit $h^2$ with the valve chamber behind the valve.

$k$ is the valve, the stem $k^1$ of which passes through a suitable guide and is provided at the outer end with a screw thread. $m$ is a sliding head or fitting, adapted to telescope within a suitable recess in the socket $e$ and provided with a hole through which the screw threaded portion of the stem $k^1$ passes, the parts being retained in position by a nut on the end of the stem as will be clearly seen.

$p$ is a helical compression spring resting between the guide for the valve stem and a recess in the head or fitting $m$, so that the valve is kept normally closed.

$r^1$, $r^2$ are projecting portions of the member $e$ forming a guideway within which is adapted to slide a block $s$. $t$ is a cross bar connecting the parts $r^1$ and $r^2$. The slide block is pushed normally outwards by means of a helical compression spring $x$, whilst $z$ is an adjusting screw passing through the cross bar $t$, so that the slide block $s$ can be adjusted in position against the pressure of the spring $x$.

Pivotally mounted at 2 upon the slide block $s$ are levers 3, the upper ends of which rest against the valve operating head or sliding fitting $m$, and the lower ends of which are interconnected and carry a rod or pin 4 upon which is rotatably mounted a roller 5.

It will thus be seen that if pressure is brought to bear against the rotatable roller 5 tending to force it outwards, this causes the levers 3 to be rocked about the pivot 2 and to push in the valve head $m$, thus opening the valve $k$.

Z is the cam plate in connection with the fixed central column or equivalent part of the machine and carrying the adjustable members now about to be described.

6 is a ring carried upon the cam plate Z and provided with apertures $7^a$, $7^b$, $7^c$ forming guideways through which slide racks $8^a$, $8^b$, $8^c$ the teeth of which mesh with corresponding pinions on axles having mounted thereon tappets or small cams $9^a$, $9^b$, $9^c$.

The general contour of these tappets will be clearly seen from the drawing, from which it will be observed that they are eccentrically mounted and so shaped that when the rod carrying any one of them is rotated it causes the flat or some more or less curved portion of the tappet to be turned towards the outside.

Thus in Fig. 2 the rack $8^a$ is in the normal position and the edge of the tappet is not projected. The rack $8^b$ is pushed outwards causing the flat portion of the tappet $9^b$ to be turned towards the outside; whilst the rack $7^c$ is drawn in causing the projecting curved portion of the tappet $9^c$ to be turned towards the outside.

10 is a circular ring or shelf mounted upon the cam plate Z and provided with apertures 11, one coming opposite each of the guide ways $7^a$, $7^b$ . . . for the racks $8^a$, $8^b$ . . . Into the aperture 11 fits a plug or socket $11^a$ to which is connected, the sheath 12 of the Bowden control, the wire or core of which 13 is attached to the corresponding rack 8, a helical compression spring 14 being fitted and tending to push the rack normally outwards.

Figure 4:
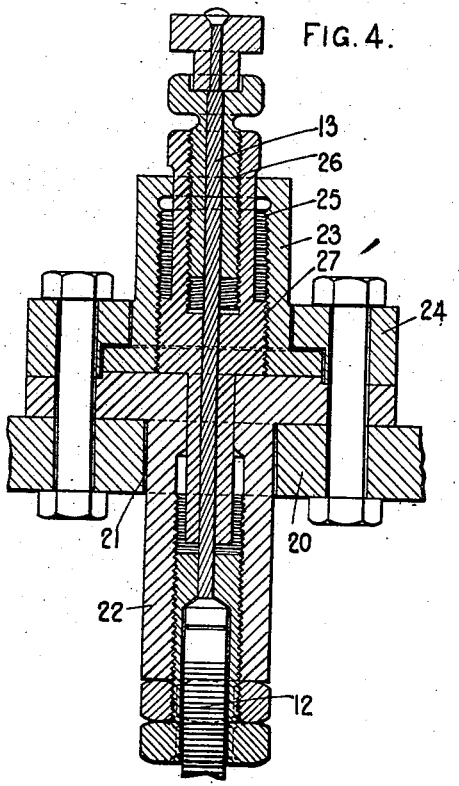
Fig. 4 is a vertical section of a form of adjusting means for the Bowden cable.

The Bowden cable passes away to the mechanism illustrated in Fig. 4 and described hereafter.

15 is another long tappet or cam, pivotally mounted at 16. 17 is a crank lever pivotally mounted at 18 and connected by an appropriate pin and slot connection at 19 to the cam 15, so that by turning the lever 17 about its fulcrum 18, the cam 15 can be swung inwards or outwards as may be required.

The position of the lever 17 is controlled in a manner analogous to that already described with reference to the racks, 12 being the sheath of the Bowden cable, the wire or core of which 13 is attached to the arm 17 of the lever, a helical compression spring 14 being provided adapted to push the lever normally outwards.

I will now consider the general operation of the mechanism already described.

The crown or rotatable head A of the machine is presumed to be revolved in a clockwise direction, while the cam plate Z remains fixed, the controlling mechanism shown at Fig. 2 having just left the last of the tappets illustrated in that view.

When it is not desired to bring the valve controlling mechanism into operation the Bowden wires are so manipulated that they allow the flattened portion of the corresponding tappet to be turned towards the outside, as at 9$^b$, the result being that the roller 5 is not pushed outwards by the tappet, and that the valve remains upon its seating.

On the other hand, when it is required to open the valve for a longer or shorter period or to a greater or less extent the tappets are set into other positions, for instance into those shown at 9$^a$ and 9$^c$, causing the roller 5 to be pushed outwards swinging over the levers 3 and opening the corresponding valve to a greater or less extent, or for a longer or shorter period.

In this way by providing any appropriate number of tappets in suitable juxtaposition to one another, it is possible to produce the same effect as that caused by an ordinary cam plate having any particular contour.

The cam plate 15 is intended to produce a long blast the extent of which can be varied as to the duration and is located at a portion of the path of travel of the operating rollers of the blowing control where it is not necessary to provide for the minute variations which can be obtained with the use of the smaller tappets.

Referring now to Fig. 4 which illustrates, as previously explained one particular method of constructing the mechanism for adjusting the Bowden wire and consequently the corresponding rack or lever to which it is connected: 20 is a suitable base plate, for instance the base plate of the machine in which is provided an aperture 21. 22 is a flanged sleeve or gland passing through the said aperture 21 and bolted in position.

23 is another flanged sleeve, formed as a nut at the upper portion and held in position by a cover 24 in such a way however that it is rotatable about its central longitudinal axis and may be rotated by means of a suitable tool from the nut portion.

The sleeve 23 is provided with a screw thread 25 on the interior.

26 is an inner tubular member, provided with an enlarged screw threaded portion 27, the thread of the screw engaging the screw thread 25 on the interior of the part 23. The member 26 is also provided with a downwardly extending portion, passing through the gland or sleeve 22, the engaging parts being squared or otherwise formed so that the members 22 and 26 cannot rotate with respect to one another.

The core of the Bowden cable passes up through a perforation in the member 26 and is secured by the usual sleeve and lock nut at the top thereof, whilst the sheath 12 of the Bowden cable is secured by the usual sleeve and nut to the part 22.

With this construction it will be seen that by rotating the member 23 by means of a box spanner or other appropriate tool, since the inner member 26 cannot rotate it will be raised or lowered according to the direction in which the nut is turned, thus causing the Bowden wire 13 to be pulled in or released against the action of the corresponding spring 14, in this way adjusting the position of the corresponding rack or lever, and bringing the associated tappet or cam into any desired position.

It will be understood that one of the elements illustrated at Fig. 4 is provided for each tappet or cam and that all the elements are within easy access of the engineer or operator in charge of the machine so that the necessary adjustment of the position of the tappet or cam can be effected with great rapidity, to suit requirements and that without stopping the working of the machine.

As previously pointed out the particular construction of the mechanism hereinbefore described is given merely by way of example, as also its application to machines, for the manufacture of glass articles, as the construction of the device may be varied within wide limits and the invention may be applied in all cases where it is desired to provide machines with cams or camways, the operating surfaces of which are to be varied in form or contour.

In place of providing pins furnished with eccentrically mounted heads or tappets or a pivoted cam controlled by a suitable lever or crank, I may provide a plurality of radially mounted slides, the outer ends of which are furnished with or formed as heads constituting the operating surface of the cam or camway, each slide being adapted to be slidden inwards or outwards independently of the neighboring slide, so that by a suitable arrangement, the required contour can be obtained.

It will be apparent that I have shown and described one embodiment of the invention, but that I do not limit myself to this construction, as a wide range of modifications may be made in the construction within the contemplation of my invention and within the scope of the appended claims.

What I claim and desire to secure by Letters Patent of the United States of America is:—

1. A cam mechanism including a supporting structure, means forming an operating surface for a cam comprising a series of eccentrically pivoted tappets, and operating means for rotating the tappets to vary the operating surface.

2. A cam mechanism including a supporting structure, means forming an operating surface for a cam comprising a series of eccentrically pivoted tappets, and operating means for rotating said tappets independently to vary the contour of the operating surface.

3. A cam mechanism including a supporting structure, means forming an operating surface for a cam comprising a series of tappets pivotally mounted on the supporting structure, gearing for rotating the tappets, and means for operating the gearing.

4. In a cam mechanism, a supporting structure, a plurality of plates providing a cam operating surface, spindles in the supporting structure on which the plates are mounted, and means for effecting a movement of each spindle independently of the others to vary the contour of the cam operating surface.

5. In a cam mechanism, a supporting structure, a plurality of plates providing a cam operating surface, spindles in the supporting structure on which the plates are eccentrically mounted, a pinion on each spindle, and means for effecting the rotation of each spindle independently comprising a separate rack for engaging each pinion, and means for effecting a movement of the racks independently of each other.

6. A cam mechanism comprising a supporting structure, a series of relatively movable members carried thereby and arranged to provide a cam operating surface, and operating means connected with said movable members for effecting a movement thereof to vary the contour of the cam operating surface.

7. A cam mechanism including a supporting structure, a member movably mounted thereon and providing a cam operating surface, and a flexible means connected with said member for effecting a movement thereof.

8. A cam mechanism including a supporting structure, a member movably mounted thereon providing a cam operating surface, means for effecting the movement of said member, and a Bowden wire for operating said means.

9. A cam mechanism including a supporting structure, a plurality of members movably mounted therein and providing a cam operating surface, and means including Bowden wires for effecting an independent movement of each of said movable members.

10. In a machine for the manufacture of glass articles, said machine having a supporting structure, a cam mechanism for controlling an operation of said machine comprising a member movably carried on the supporting structure providing an operating surface for a cam, a controlling means associated with the movable means for effecting a movement of said member, and a cam for engaging said cam operating surface.

11. In a machine for forming glass articles, a relatively fixed supporting structure and a movable structure, an air valve on the movable structure, a cam for operating the valve, a cam operating surface on the fixed structure for effecting the actuation of said cam upon the movement of the movable structure, and means for changing the cam operating surface during the actuation of the machine.

In testimony whereof, I have hereunto subscribed my name.

ROBERT FREDERICK HALL.